(12) United States Patent
Doswell et al.

(10) Patent No.: US 11,246,684 B2
(45) Date of Patent: Feb. 15, 2022

(54) DENTAL PROSTHESIS

(71) Applicant: Harrogate Implant Innovations Ltd, North Yorkshire (GB)

(72) Inventors: Tim Doswell, Knaresborough (GB); Christopher Egan, Knaresborough (GB); Stephen Campbell, Knaresborough (GB)

(73) Assignee: HARROGATE IMPLANT INNOVATIONS LTD, North Yorkshire (GB)

( * ) Notice: Subject to any disclaimer, the term of this patent is extended or adjusted under 35 U.S.C. 154(b) by 354 days.

(21) Appl. No.: 16/336,578

(22) PCT Filed: Sep. 25, 2017

(86) PCT No.: PCT/GB2017/052860
§ 371 (c)(1),
(2) Date: Mar. 26, 2019

(87) PCT Pub. No.: WO2018/060683
PCT Pub. Date: Apr. 5, 2018

(65) Prior Publication Data
US 2019/0223987 A1    Jul. 25, 2019

(30) Foreign Application Priority Data

Sep. 27, 2016 (GB) ..................... 1616389
Nov. 22, 2016 (GB) ..................... 1619710

(51) Int. Cl.
*A61C 8/00* (2006.01)
*A61C 3/16* (2006.01)

(52) U.S. Cl.
CPC ............. *A61C 8/0048* (2013.01); *A61C 3/16* (2013.01); *A61C 8/0089* (2013.01); *A61C 8/0018* (2013.01)

(58) Field of Classification Search
CPC ....... A61C 8/0048; A61C 3/16; A61C 8/0089; A61C 8/0018; A61C 8/0033; A61C 8/0065
See application file for complete search history.

(56) References Cited

U.S. PATENT DOCUMENTS 2,258,207 A * 10/1941 Irwin ................... A61C 8/0048
                                                            433/173
2,669,779 A *  2/1954 Zuccoli ................ A61C 13/275
                                                            433/193
(Continued)

FOREIGN PATENT DOCUMENTS

EP    1 224 920 A1    7/2002
ES    2103196 A1      8/1997
(Continued)

OTHER PUBLICATIONS

International Search Report and Written Opinion dated Dec. 4, 2017 for International Application No. PCT/GB2017/052860, entitled "Dental Prosthesis".

*Primary Examiner* — Nicholas D Lucchesi
(74) *Attorney, Agent, or Firm* — Hamilton, Brook, Smith & Reynolds, P.C.

(57) ABSTRACT

There is described a dental prosthesis for forming a friction fit attachment to a dental implant or dental connector. The prosthesis comprises a release device comprising a release member that is movable relative to the prosthesis from a first position to a second position. When the release member is in the first position the release device is not operable to impart a separating force to a friction fit attachment between the implant or connector and the prosthesis and when the release member is in the second position the release device is operable to impart a separating force to a friction fit attachment between the implant or connector and the prosthesis.

21 Claims, 4 Drawing Sheets

(56) References Cited

U.S. PATENT DOCUMENTS

| | | | | |
|---|---|---|---|---|
| 2,857,670 | A | * | 10/1958 | Kiernan, Jr. .......... A61C 8/0018 433/175 |
| 3,497,953 | A | * | 3/1970 | Weissman ............. A61C 8/0075 433/173 |
| 3,708,883 | A | * | 1/1973 | Flander ................ A61C 8/0075 433/174 |
| 3,747,215 | A | | 7/1973 | Joyner, Jr. |
| 4,531,917 | A | * | 7/1985 | Linkow ................. A61C 8/005 433/176 |
| 4,850,869 | A | * | 7/1989 | Steinfort ............ A61C 13/0003 433/172 |
| 5,004,421 | A | * | 4/1991 | Lazarof ................ A61C 8/0033 433/173 |
| 5,030,102 | A | * | 7/1991 | Lang .................... G09B 23/283 434/263 |
| 5,033,962 | A | * | 7/1991 | Scatena ................ A61C 8/0068 433/169 |
| 5,141,435 | A | * | 8/1992 | Lillard ................. A61C 8/0033 433/176 |
| 5,470,230 | A | * | 11/1995 | Daftary ................ A61C 8/0033 433/173 |
| 5,489,210 | A | * | 2/1996 | Hanosh ................ A61C 8/0033 433/173 |
| 5,733,122 | A | * | 3/1998 | Gordon ................. A61C 8/005 433/172 |
| 5,842,864 | A | * | 12/1998 | Unger ................. A61C 13/273 433/172 |
| 5,848,897 | A | * | 12/1998 | Jansen ................. A61C 13/26 433/182 |
| 5,882,351 | A | * | 3/1999 | Fox ........................ A61B 17/88 606/63 |
| 5,890,902 | A | * | 4/1999 | Sapian ................. A61C 8/0033 433/173 |
| 5,897,320 | A | * | 4/1999 | Gittleman ................ A61C 3/16 433/180 |
| 5,915,968 | A | * | 6/1999 | Kirsch ................... A61C 8/005 433/173 |
| 6,332,778 | B1 | * | 12/2001 | Choung ............... A61C 8/0033 433/172 |
| 2011/0053114 | A1 | | 3/2011 | Shimoda |
| 2011/0282396 | A1 | * | 11/2011 | Shimko ................ A61C 8/0074 606/303 |
| 2014/0178835 | A1 | * | 6/2014 | Lin ........................ A61C 8/008 433/173 |
| 2017/0202649 | A1 | * | 7/2017 | Bernhard ............... A61C 1/084 |
| 2018/0185123 | A1 | * | 7/2018 | Kaup ................... A61C 8/0071 |

FOREIGN PATENT DOCUMENTS

| | | |
|---|---|---|
| JP | 2002-153493 A | 5/2002 |
| JP | 2011-78489 A | 4/2011 |
| WO | 2006/087021 A1 | 8/2006 |
| WO | 2009/035968 A1 | 3/2009 |
| WO | 2017199118 A1 | 11/2017 |

* cited by examiner

DENTAL PROSTHESIS

This application is the U.S. National Stage of International Application No. PCT/GB2017/052860, filed Sep. 25, 2017, which designates the U.S., published in English, and claims priority under 35 U.S.C. § 119 or 365(c) to Great Britain Application No. 1616389.1, filed Sep. 27, 2016 and Great Britain Application No. 1619710.5, filed Nov. 22, 2016. The entire teachings of the above applications are incorporated herein by reference.

FIELD

The present invention relates to a release device for a dental prosthesis. More specifically, the present invention relates to a release device for use in a friction fit dental prosthesis.

BACKGROUND

Dental prostheses, such as crowns, bridges and dentures, are commonly used to replace missing teeth. Such prostheses may be held in place in the mouth by one of several methods; connections with other teeth, connections to dental implants, by suction, or with passive holding by surrounding muscles.

The use of dental implants normally involves inserting an implant into the bone of the jaw. As such, dental implants can be favoured because of the increased stability and conservation of natural tooth tissue that is provided compared to the other methods of attachment to the mouth.

The dental prostheses can be directly attached to the dental implant(s), or via connectors such as press-stud style connections, bars or conical abutments, which act as an intermediate between the implant(s) and the prosthesis. Generally, the prosthesis attaches to the implant(s) via some form of abutment(s) or bar.

The attachment between the prosthesis and the implant or connector can be fixed or removable. Methods to form a fixed attachment include screws or dental cement. There is, however, a desire to provide users with a dental prosthesis that they can remove themselves so that the prosthesis and supporting connectors can be cleaned easily at home. This desire is partly born out of growing concern over a condition called "peri-implantitis" which can lead to dental implant failure. Although "fixed" implant prostheses can be designed for home maintenance, this can be to the detriment of the aesthetics of the teeth which users may find unacceptable.

The use of removable attachment methods with dental implants can provide a means to allow the user to remove the prosthesis at will in order to clean the prosthesis and the connector whilst also providing improved control over the aesthetics. A removable attachment may be obtained with methods such as a press-stud style connection or the formation of a friction fit between the prosthesis and the implant or connector. A removable prosthesis must still provide sufficient stability during use. A press-stud style connection is commonly used but this type of attachment can loosen with time and may then move and dislodge during chewing function. On the other hand, friction fit attachments can provide more stability. This type of attachment normally uses a metal-to-metal friction fit in order to provide the desired level of stability during use. A variety of metal-metal friction fit connections have been developed such as bars and conical abutments which provide the user with a removable set of teeth but with a more "fixed" feel.

However, it has been found that although the friction fit connections deliver excellent levels of function, users can struggle to remove their prosthesis due the strength of the seal that develops between the prosthesis and the implant or connector. As such, the user must resort to seeking clinical assistance to remove the prosthesis, resulting in reduced hygiene and/or increased cost and time expenditure.

Accordingly, there is a requirement for a means of enabling a user to easily and safely remove a friction fit dental prosthesis whilst maintaining the good stability and aesthetics that can be provided by friction fit attachments. It is therefore an object of aspects of the present invention to address one or more of the abovementioned or other problems.

SUMMARY

According to a first aspect of the present invention there is provided a release device for a friction fit dental prosthesis for assisting with the release of the dental prosthesis from a friction fit with a dental implant or dental connector, the device comprising:
  housing for attachment to the dental prosthesis;
  a release member that is moveable relative to the housing from a first position to a second position; and
  wherein the release device is for arrangement in the prosthesis such that when the release member is in the first position the release device is not operable to impart a separating force to a friction fit attachment between the implant or connector and the prosthesis, and when the release member is in the second position the release device is operable to impart a separating force to a friction fit attachment between the implant or connector and the prosthesis.

Advantageously, when a seal has formed between the prosthesis and the implant or connector that is too strong for removal of the prosthesis by the hand of the user alone, the user may simply actuate the release member of the release device to provide sufficient force to break the seal, enabling the prosthesis to thereafter be more easily removed by hand, all without requiring clinical intervention. The present invention therefore enables a prosthesis that has desirable aesthetics and sufficient stability whilst also permitting the user to maintain effective hygiene of the prosthesis, implant and connector without requiring further clinical assistance.

According to a second aspect of the present invention there is provided a dental prosthesis for forming a friction fit attachment to a dental implant or dental connector, the prosthesis comprising:
  a release device comprising a release member that is movable relative to the prosthesis from a first position to a second position; and
  wherein when the release member is in the first position the release device is not operable to impart a separating force to a friction fit attachment between the implant or connector and the prosthesis and when the release member is in the second position the release device is operable to impart a separating force to a friction fit attachment between the implant or connector and the prosthesis.

According to a third aspect of the present invention, there is provided a kit of parts comprising:
  a dental implant and/or a dental connector for attachment to a dental implant;
  a dental prosthesis operable to form a friction fit with the implant or connector, the prosthesis comprising a release device comprising a release member that is movable relative to the prosthesis from a first position to a second position; and wherein when the release member is in the first position the release device is not operable to impart a separating force to a friction fit attachment between the implant or connector and the prosthesis and when the release member is in the second position the release device is operable to impart a separating force to a friction fit attachment between the implant or connector and the prosthesis.

According to a fourth aspect of the present invention, there is provided a kit of parts comprising:

a composition for forming a dental prosthesis; and
a release device comprising housing for attachment to the dental prosthesis;
the release device further comprising a release member that is moveable relative to the housing from a first position to a second position; and
wherein the release device is for arrangement in the prosthesis such that when the release member is in the first position the release device is not operable to impart a separating force to a friction fit attachment between the implant or connector and the prosthesis, and when the release member is in the second position the release device is operable to impart a separating force to a friction fit attachment between the implant or connector and the prosthesis.

According to a fifth aspect of the present invention, there is provided a kit of parts comprising:

a release device for a friction fit dental prosthesis for assisting with the release of the dental prosthesis from a dental implant or dental connector, the device comprising housing for attachment to the dental prosthesis, and a release member that is moveable relative to the housing from a first position to a second position;
wherein the release device is for arrangement in the prosthesis such that when the release member is in the first position the release device is not operable to impart a separating force to a friction fit attachment between the implant or connector and the prosthesis, and when the release member is in the second position the release device is operable to impart a separating force to a friction fit attachment between the implant or connector and the prosthesis;
the kit further comprising a mating tool operable to actuate the release member from the first position to the second position.

According to a sixth aspect of the present invention there is provided a method for the release of a friction fit between a dental prosthesis according to the second aspect of the present invention and a dental implant or dental connector, the method comprising the steps of:

a. actuating the release member from the first position to the second position such that the prosthesis is released from the dental implant or dental connector.

The release device may be incorporated during the manufacture of the prosthesis or it may be retrofitted to an existing prosthesis. According to a seventh aspect of the present invention there is provided a method for the manufacture of a dental prosthesis according to the second aspect of the present invention, comprising the steps of:

a. incorporating the release device into a prosthesis during the manufacture of a new prosthesis; or
b. drilling a hole into a prosthesis and bonding it within the hole.

According to an eighth aspect of the present invention there is provided a computer-readable medium having computer-executable instructions adapted to cause a 3D printer to print a release device, prosthesis, dental implant and/or dental connector according to any aspect of the present invention.

According to a ninth aspect of the present invention there is provided the use of a release device according to the first aspect of the present invention for the release of a dental prosthesis from a friction fit attachment with a dental implant or dental connector.

The release device of the present invention is for arrangement in a dental prosthesis such that the device may actuate the release of a friction fit between the prosthesis and a dental implant and/or dental connector.

Suitably, the release device has a width, depth and height each of up to 20 mm, such as up to 15 mm or up to 10 mm. As such, the release device may have no dimension that is larger than the abovementioned sizes. It will be appreciated that an appropriate size for the release device is important in order to achieve the desired aesthetics and functionality of the dental prosthesis.

The release device of the second and third aspects of the present invention may comprise a housing.

The housing of the release device may be formed of metal, preferably titanium. Suitably, the housing may be integrally formed or formed of separate components, preferably the housing is integrally formed.

The outer face of the housing may comprise any suitable shape. The outer face of the housing may be substantially cylindrical.

The outer face of the housing may comprise retention members operable to assist with retaining the release device in the prosthesis. The retention members may comprise one or more lugs, suitably a plurality of spaced lugs extending outwardly from the housing.

Suitably, the release member comprises engagement means operable to cooperate with a mating tool such as to provide leverage for the actuation of the release member using the mating tool. Said engagement means may comprise a screw drive. The screw drive may be in any suitable shape that is operable to cooperate with the respective mating tool. Preferably, the screw drive is a hex-type screw drive.

Any of the aspects of the present invention may further comprise a mating tool operable to actuate the release member from the first position to the second position. Suitably, the mating tool is an angle corrected screw driver. Preferably, the mating tool comprises a release member engagement portion operable to cooperate with a screw drive on the release member. Suitably, the mating tool comprises an angled shaft extending between a handle portion and a release member engagement portion. Suitably, the shaft is angled at between 20° and 160°, such as between 40° and 140°, or 60° and 120°, or 80° and 100°, preferably the shaft is angled at substantially 90°.

The release member may be moved from the first to the second position by translational and/or rotational movement, preferably by rotational movement. The release member may be formed of any suitable material. Suitably the release member is formed from metal, such as titanium.

The housing and/or the prosthesis may be operable to hold the release member in the second position. By 'hold' it is meant that the housing and/or prosthesis is able to keep the release member in the second position for a period of time sufficient to allow the mechanical advantage generated by the movement of the release member to be exerted on the attachment between the prosthesis and the implant or connector such as to release the attachment between the prosthesis and the implant or connector.

Suitably, the release device is operable to provide graduated levels of separating force. Preferably the housing or prosthesis is operable to hold the release member at more than one position in which a separating force is operable to be applied. For instance, the housing or prosthesis may be able to hold the release member at several different positions wherein each position allows the release device to impart a separating force between the prosthesis and the implant or connector, and wherein the different positions provide different amounts of separating force. For example, the housing or prosthesis may be able to hold the release member in position 2a, 2b or 2c, wherein the amount of separating force applied by the release device increases from position 2a to position 2c. Suitably, the release member and the housing and/or prosthesis comprise cooperating helical threads. The graduated levels of force may be provided by the cooperating helical threads arranged on the release member and the housing or prosthesis. As such, the amount of force applied for separating the prosthesis and the implant or connector may be varied depending on the strength of the seal that has formed.

Suitably, the release member of the release device of any aspect of the present invention is a captive release member within the housing and/or prosthesis. By "captive" it is meant that the release member cannot be removed from the housing and/or prosthesis without altering the respective housing, prosthesis and/or release member in a manner that allows for the release member to be removed. Preferably, the release member is captively held within a captive chamber in the housing.

Preferably, the release member is removeably captive. The captive chamber of the housing may comprise a detachable wall such that detachment of the wall permits removal of the release member from the housing.

Advantageously, providing a captive release member reduces the risk of a moveable part becoming separated from the device during use, improving the safety of the device. Further, if the captive release member is removable in a controlled manner then the user is able to better clean the device when necessary and/or replace the release member should it become damaged.

The detachable wall may be a protective cap. Suitably, the protective cap forms the upper wall of the captive chamber. Optionally, the protective cap may form part of the side wall of the captive chamber and/or housing. The protective cap may comprise an aperture for providing access to the engagement means of the release member. Preferably, the protective cap extends across a portion of the upper face of the release member whilst the aperture provides access to the engagement means of the release member. As such, the protective cap may prevent the release member from escaping the captive chamber whilst also protecting some of the exposed faced of the release member. The protective cap may comprise a ridge extending around and above the upper face of the release member. As such, the protective cap may protect the prosthesis from damage during actuation of the release member with a mating tool through, for example, slippage of the mating tool. The outer face of the protective cap may be downwardly sloped towards the aperture or bevelled. The protective cap may be removeably attachable to the housing or prosthesis by any suitable means, such as cooperating helical threads arranged on the protective cap and the housing or prosthesis. The release member and the protective cap may be operable to form a close fit abutment around the aperture of the protective cap, such as to help prevent ingress of material into the device.

Advantageously, a sloping outer face in the protective cap helps to guide the mating tool into the engagement means of the release member.

The prosthesis may be a crown, bridge or denture. The prosthesis or prosthesis composition may be formed of a polymer, such as an acrylic polymer, for example polymethylmethacrylate (PMMA), or formed of composite resins or porcelains.

The release device may be operable to be arranged or is arranged in the prosthesis such that it can be actuated on an occlusal surface of the prosthesis. Suitably, the release device is arranged in the prosthesis such that the release member may be actuated on an occlusal surface of the prosthesis. Optionally, the release device may be arranged remotely from an occlusal surface. For example, the release device may be operable to be arranged or is arranged in the prosthesis such that is can be actuated on a side surface of the prosthesis, preferably a buccal face. Advantageously, arranging the actuation point of the release member away from the occlusal surface of the prosthesis reduces the risk of food ingress into the release device and as such improves hygiene.

Any suitable type of dental implant and dental connector, when present, may be used with the present invention as long as the implant or connector is operable to form a friction fit attachment with the release device or prosthesis. Suitably, the portion of the implant or abutment operable to form the friction fit attachment is formed of metal, preferably titanium. Preferably, the dental connector is in the form of an abutment, such as a conical abutment, bars and/or parallel sided telescopic abutments, most preferably conical abutments.

The release member of the release device may be arranged or be operable to be arranged in the prosthesis such that in the second position the release member abuts the surface of the implant or connector, suitably the outer face of the implant or connector. Preferably, the release member is operable in the first position not to abut the surface of the implant or connector. Should the connector comprises a bore for receiving attachment means to connect the connector to an implant, suitably the release member has a width that is greater than the width of the bore of the connector.

The prosthesis may comprise an attachment chamber operable to receive and form a friction fit with a suitably sized dental implant or dental connector. Suitably, the housing of the release device comprises an attachment chamber that is operable to receive the dental implant or dental connector and form a friction fit therewith.

The attachment chamber of the housing or prosthesis may be tapered, suitably it is tapered such as to narrow upwardly from a widest point at an open end that is operable to receive the implant or connector. Preferably, the chamber tapers at an angle of between 0.1° and 15°, such as between 1° and 10°, or between 2° and 8° or 3° and 7° or 4° and 6°. Preferably, the internal surface of the chamber is substantially smooth. Preferably the interior surface of the chamber is formed of metal, such as titanium or gold.

The release member may be arranged above the attachment chamber, such as at an opposite end to the open end for receiving the implant or connector. Preferably the release member is held captively above the attachment chamber.

Suitably, the release member is operable to extend into the attachment chamber of the housing or prosthesis. Suitably, in the second position the release member extends further into the attachment chamber than in the first position.

The release member may be operable to be moved from the first position to the second position by rotation of the release member, preferably, the release member is operable to rotate about an axis that is transverse to the longitudinal axis of the attachment chamber of the housing.

The release member may comprise a cam, suitably the cam comprises a projection that makes contact with the abutment or implant in the second position to impart a separation force.

Suitably, the release member is held within the housing such that rotation of the release member does not cause translational movement of the release member. Preferably, actuation of the separating force converts the rotational movement of the release member into translational movement of the prosthesis.

Where used herein the phrase 'separating force' is intended to mean a force sufficient to loosen the attachment between the implant or connector and the prosthesis to the extent that that an average user is then able to manually remove the prosthesis. It will be appreciated that the problem addressed by the present invention is that a seal can form between a dental prosthesis and a dental implant such that the prosthesis cannot be removed without clinical intervention. The present invention provides a device for releasing the seal between the prosthesis and the implant or connector such that the prosthesis may be removed by the user without requiring clinical intervention.

All of the features contained herein may be combined with any of the above aspects in any combination.

BRIEF DESCRIPTION OF DRAWINGS

The invention will now be described by way of example only and with reference to the accompanying drawings, in which.

DESCRIPTION OF EMBODIMENTS

Figure 1:
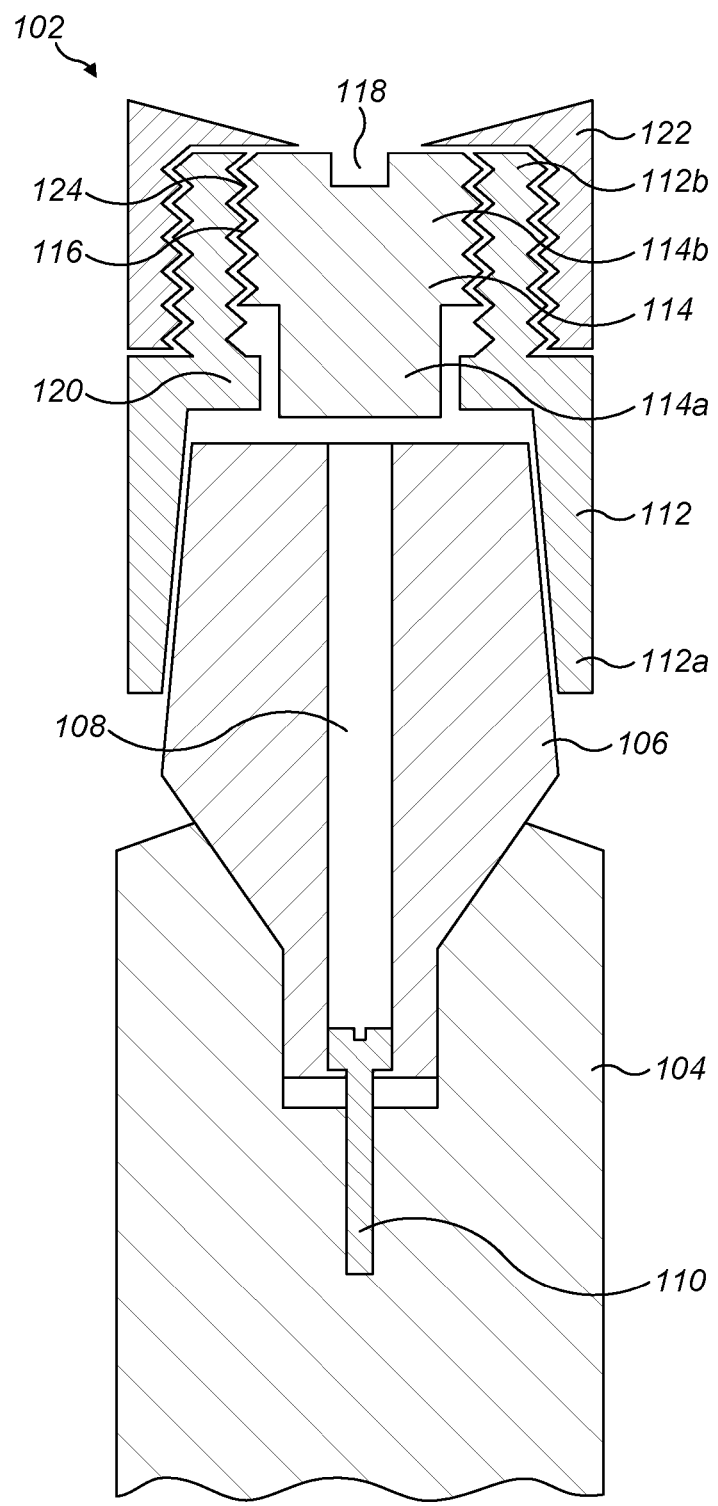
FIG. 1 shows a side sectional view of a first embodiment of a release device according to the first aspect of the present invention.
Figure 3:
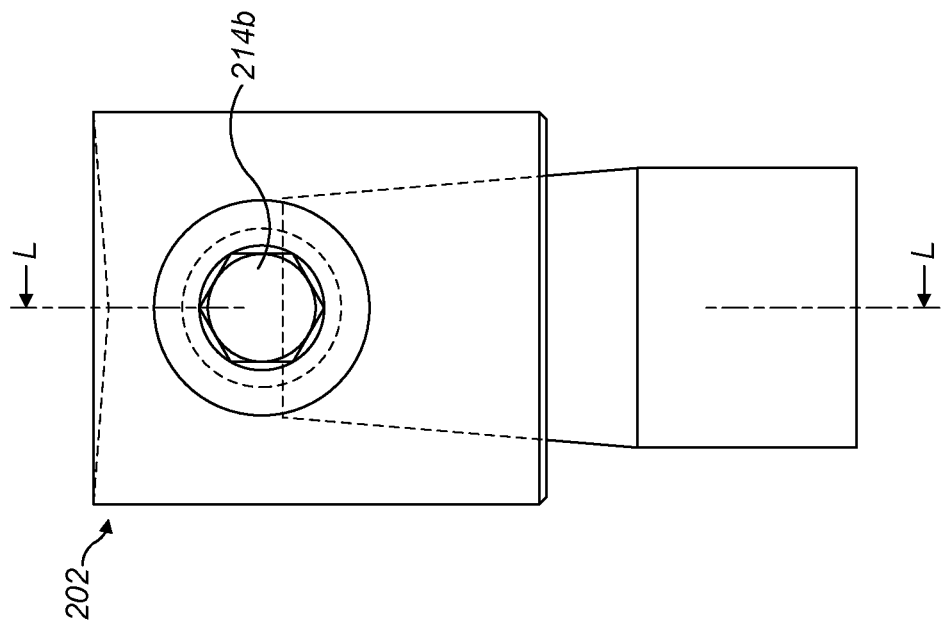
FIG. 3 shows a front view of the release device of FIG. 2.
Figure 2:
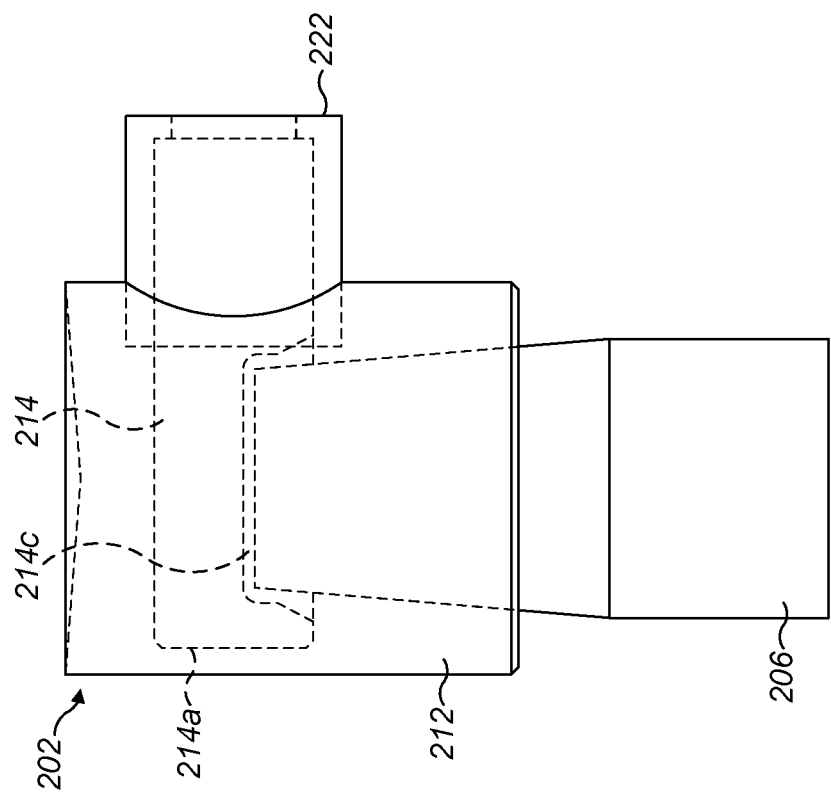
FIG. 2 shows a side view of a second embodiment of a release device according to the first aspect of the present invention.
Figure 5:
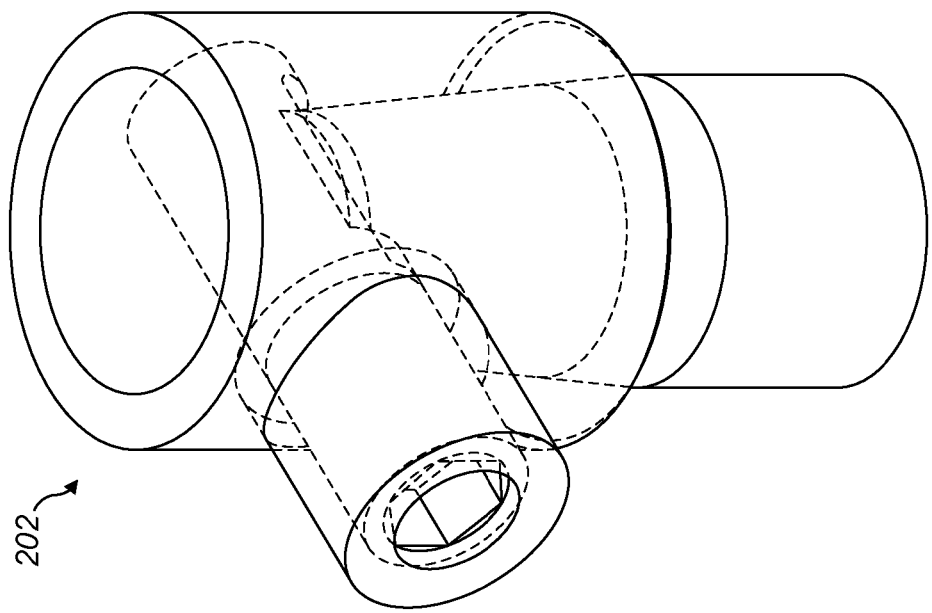
FIG. 5 shows a perspective view of the release device of FIG. 2.
Figure 4:
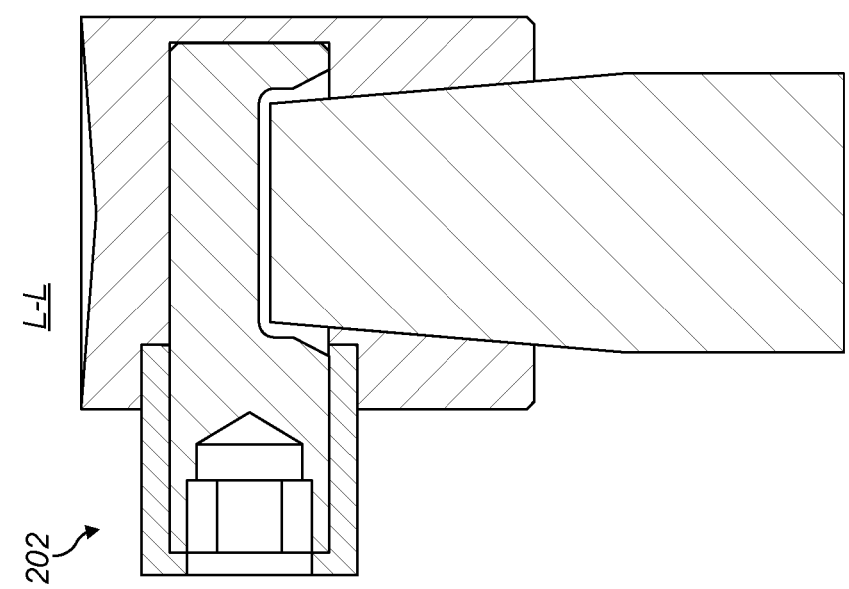
FIG. 4 shows a sectional view along line L-L in FIG. 3.

Reference is first made to the first embodiment of the present invention as given to scale in FIG. 1, which shows release device 102 in a friction fit arrangement with dental abutment 106.

Dental conical abutment 106 is attached to dental implant 104 via screw 110 extending from the bottom of abutment 106 into the top of implant 104. Screw 110 is arranged in a bore 108 of abutment 106, the central bore 108 extending longitudinally from an open end at the top of abutment 106 to a flanged open end at the bottom of abutment 106 that receives and holds screw 110. In use, dental implant 104 is fixed in the jaw bone of the user and abutment 106 extends upwardly from implant 104. Abutment 106 is formed of titanium and the smooth conical outer face of abutment 106 tapers inwardly at an angle of about 5° toward a truncated upper face.

In FIG. 1, release device 102 is shown arranged in a friction fit over the outer face of abutment 106. Release device 102 is formed of housing 112, release member 114 and protective cap 122. Housing 112 is formed of titanium and has a generally cylindrical outer face and central bore extending longitudinally through the housing from a first open end 112a to a second open end 112b. The smooth conical internal face of the bore in the region of first end 112a narrows from a widest point at the outer edge of the first end 112a toward second end 112b at a gradient of about 5°. This region of the bore defines a chamber for receiving and forming a friction fit with abutment 106. The chamber has dimensions such that, as shown in FIG. 1, when release device 102 is placed over abutment 106 this portion of the bore forms a close friction fit with the outer face of abutment 106.

Toward the second end 112b of the bore of housing 112 is arranged captive release member 114. Release member 114 contains a solid non-deformable integrally formed cylindrical head 114b and cylindrical tail 114a. Tail 114a extends concentrically from the bottom face of head 114b and has a narrower diameter than head 114b. The lower face of tail 114a is planar and the upper face of head 114b contains hex screw drive 118. Arranged around the side face of head 114b is helical thread 116.

Release member 114 is held in the bore at the lower end thereof by flange 120 extending inwardly from the inner face of housing 112, and at the upper end thereof by protective cap 122. Flange 120 delineates an aperture within the bore of housing 112 that is of sufficient width to allow the passage of tail 114a but not head 114b. Annular protective cap 122 has a planar sloping upper face extending downwardly toward a central aperture that is of a narrower diameter than the diameter of head 114b but is wider than the width of hex screw drive 118. Cap 122 is removably attached to the upper edge of the second end 112b of housing 112 by cooperating helical threads arranged on the internal face of protective cap 122 and the outer face of housing 112.

Extending on the inner face of housing 112 from flange 120 to the upper edge of end 112b is helical thread 124. Helical thread 124 is configured to cooperate with helical thread 116 of release member 114 such that rotation of release member 114 in a first direction lowers release member 114 toward the first end 112a of housing 112 and rotation in the reverse direction raises release member 114 back toward the second end 112b of housing 112. Abutment of the lower face of head 114b with the upper face of flange 120 determines the maximum extent by which release member 114 can be lowered.

On the outer face of housing 112 can be arranged a plurality of spaced perpendicularly extending retention lugs (not shown). A dental prosthesis (not shown) can be formed around the outer face of housing 112, the retention lugs assist with securing release device 102 within the prosthesis. In the present embodiment, release device 102 would be arranged within the prosthesis such that the screw drive-containing head 118 is accessible from an occlusal face of the prosthesis.

As shown in FIG. 1, when release device 102 is arranged in friction fit with abutment 106 and release member 114 is in the first position, release member 114 is raised from the upper face of abutment 106. It will be appreciated however that optionally in the first position release member 114 may abut the upper face of abutment 106 without applying the necessary force to cause a separation between abutment 106 and the prosthesis.

To detach release device 102 (and therefore the prosthesis) from abutment 106, a user actuates the releasing force by causing rotation of release member 114 toward end 112a with, for example, an appropriate mating tool, such as a screw driver. The user rotates release member 114 until sufficient force is generated by the action of release member 114 abutting the top face of abutment 106 whilst being rotated down the cooperating helical threads 116 and 124 that device 102 is lifted from the friction fit with abutment 106. Wth the friction fit released, the user may manually extract device 102 from the abutment 106 and proceed to clean device 102 and abutment 106. To replace device 102 the user returns release member 114 to the first position and places device 102 back over abutment 106.

Reference is now made to FIGS. 2 to 5 which show a second embodiment of a release device 202 according to the present invention. Release device is arranged in a friction fit over dental abutment 206 in the same manner as for release device 102. Release device 202 is formed of housing 212, release member 114 and protective cap 122.

Housing 212 is formed of titanium and has a generally cylindrical outer face with the exception of a central bore extending inwardly from the base of housing 212 and exiting housing 212 at a side face. The initial abutment-receiving portion of the central bore of housing 212 is the same as release device 102.

At the top of the bore of housing 212 is laterally extending captive release member 214. Release member 214 is generally of cylindrical shape except for cut-away portion 214c, which is sized to receive the top portion of abutment 206. A first end 214a of release member 214 is arranged in an indent in the internal face of housing 212. Release member 214 then extends laterally through the bore of housing 212 such that second end 214b protrudes from the side wall of housing 212. Protective cap 222 is arranged over the protruding end 214b of release member 214. The upper face of end 214b contains a hex screw drive.

Annular protective cap 222 has a planar sloping upper face extending downwardly toward a central aperture that is of a narrower diameter than the diameter of release member end 214b but is wider than the width of the hex screw drive. Cap 222 is removably attached the side face of housing 212.

On the outer face of housing 212 can be arranged a plurality of spaced perpendicularly extending retention lugs (not shown). A dental prosthesis (not shown) can be formed around the outer face of housing 212, the retention lugs assist with securing release device 202 within the prosthesis. In the present embodiment, release device 202 would be arranged within the prosthesis such that screw drive-containing end 214b of release member 214 is accessible from a side face of the prosthesis.

To detach release device 202 (and therefore the prosthesis) from abutment 206, a user actuates the releasing force by causing rotation of release member 214 with, for example, an appropriate mating tool, such as a screw driver. The user rotates release member 214 until sufficient force is generated by the rotational action of release member 214 abutting the top face of abutment 206 that device 202 is lifted from the friction fit with abutment 206. With the friction fit released, the user may manually extract device 202 from the abutment 206 and proceed to clean device 202 and abutment 206. To replace device 202 the user returns release member 214 to the first position and places device 202 back over abutment 206. Attention is directed to all papers and documents which are filed concurrently with or previous to this specification in connection with this application and which are open to public inspection with this specification, and the contents of all such papers and documents are incorporated herein by reference.

Figure 6:
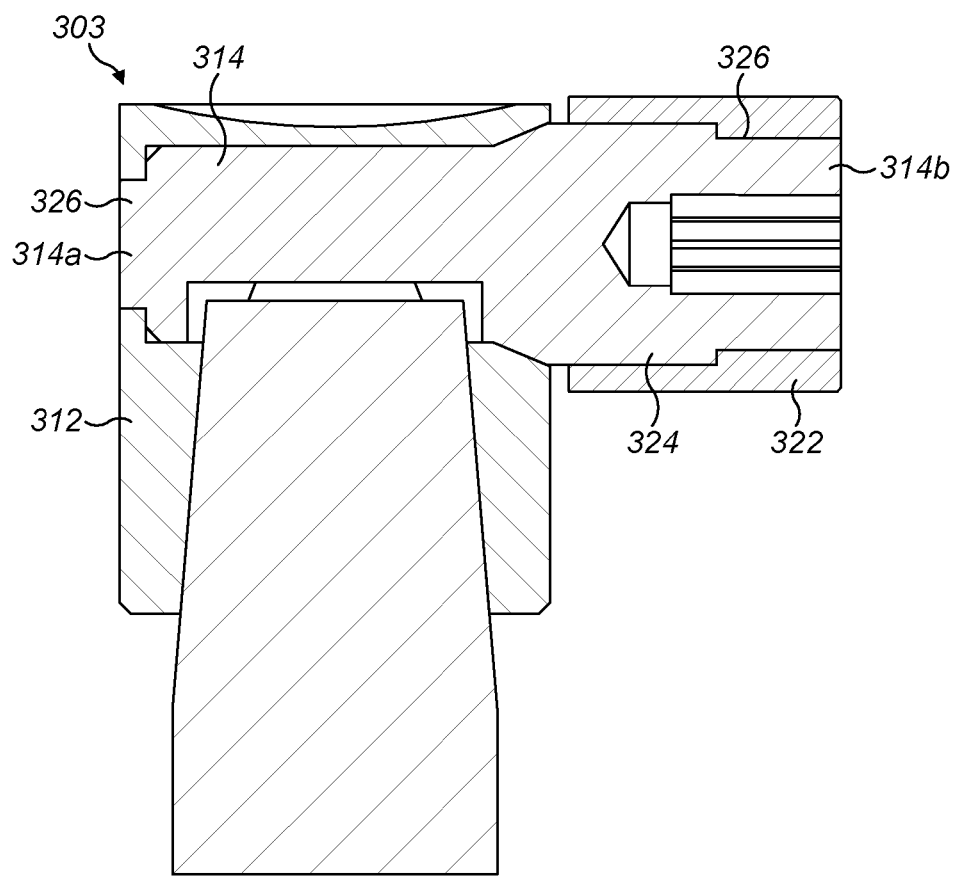
FIG. 6 shows a side section view of a third embodiment of a release device according to the first aspect of the present invention.

Reference is now made to FIG. 6 which shows a third embodiment of a release device 303 according to the present invention. Release device 303 is the same as release device 202 except that first end 314a of release member 314 further comprises cylindrical projection 326 that extends through housing 312 such that the outer face of first end 314a of release member 314 is flush with the outer face of housing 312. At the base of projection 326 end 314a has shoulders extending outwardly, said shoulders abutting the internal face of housing 312 to contain release member 314 in housing 312 in use. Further, release member 314 has annular flange 324 toward end 314b which abuts against annular flange 326 in the bore of protective cap 322 such as to contain release member 314 inside release device 303 in use. In this arrangement the outer face of end 314b is flush with the outer face of the end of cap 322.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A release device for a friction fit dental prosthesis for assisting with the release of the dental prosthesis from a friction fit with a dental implant or dental connector, the device comprising:
   (i) a housing for attachment to the dental prosthesis, wherein the housing comprises an attachment chamber operable to receive the dental implant or dental connector, and form a friction fit attachment between the dental implant or dental connector and the prosthesis; and
   (ii) a release member that is movable relative to the housing from a first position to a second position by rotational movement about an axis that is transverse to a longitudinal axis of the attachment chamber of the housing;
   wherein the release device is for arrangement in the prosthesis such that when the release member is in the first position the release device is not operable to impart a separating force to the friction fit attachment between the dental implant or dental connector and the prosthesis, and when the release member is in the second position the release device is operable to abut the dental implant or dental connector so as to impart a separating force to the friction fit attachment between the dental implant or dental connector and the prosthesis; and
   wherein the release member is a captive release member arranged internally within the housing.

2. A release device as claimed in claim 1 wherein an outer face of the housing comprises retention members operable to assist with retaining the release device in the prosthesis.

3. A release device, as claimed in claim 1 wherein the release device is operable to provide graduated levels of separating force.

4. A release device as claimed in claim 1 wherein the release device is operable to be arranged in the prosthesis such that it can be actuated on an occlusal or buccal surface of the prosthesis.

5. A release device as claimed in claim 1 wherein the release member is arranged above the attachment chamber.

6. A release device as claimed in claim 1 wherein the release member is operable to extend into the attachment chamber of the housing, suitably, in the second position the release member extends further into the attachment chamber than in the first position.

7. A release device as claimed in claim 1 wherein the release member comprises a cam, suitably the cam comprises a projection that makes contact with an abutment or the dental implant or dental connector in the second position to impart the separating force.

8. A release device as claimed in claim 1 wherein the attachment chamber of the housing comprises a detachable wall.

9. A release device as claimed in claim 8 wherein the detachable wall is a protective cap.

10. A dental prosthesis for forming a friction fit attachment to a dental implant or dental connector, the prosthesis comprising:
    a release device comprising:
    (i) a housing for attachment to the dental prosthesis, wherein the housing comprises an attachment chamber operable to receive the dental implant or dental connector, and form a friction fit attachment between the dental implant or dental connector and the housing; and
    (ii) a release member that is movable relative to the housing from a first position to a second position by rotational movement about an axis that is transverse to a longitudinal axis of the attachment chamber of the housing;
    wherein when the release member is in the first position the release device is not operable to impart a separating force to the friction fit attachment between the dental implant or dental connector and the housing, and when the release member is in the second position the release device is operable to abut the dental implant or dental connector so as to impart a separating force to the friction fit attachment between the dental implant or dental connector and the housing; and
    wherein the release member is a captive release member arranged internally within the housing.

11. A dental prosthesis as claimed in claim 10 wherein the dental prosthesis is a crown, bridge or denture.

12. A kit of parts comprising:
    a dental implant and/or a dental connector for attachment to the dental implant;
    a dental prosthesis operable to form a friction fit attachment with the dental implant or dental connector, the prosthesis comprising:
    a release device comprising:
        (i) a housing for attachment to the dental prosthesis, wherein the housing comprises an attachment chamber operable to receive the dental implant or dental connector, and form the friction fit attachment between the dental implant or dental connector and the housing; and
        (ii) a release member that is movable relative to the housing from a first position to a second position by rotational movement about an axis that is transverse to a longitudinal axis of the attachment chamber of the housing;
    wherein when the release member is in the first position the release device is not operable to impart a separating force to the friction fit attachment between the dental implant or dental connector and the housing, and when the release member is in the second position the release device is operable to abut the dental implant or dental connector so as to impart a separating force to the friction fit attachment between the dental implant or dental connector and the housing; and
    wherein the release member is a captive release member arranged internally within the housing.

13. A kit of parts as claimed in claim 12 wherein the dental prosthesis is a crown, bridge or denture.

14. A kit of parts comprising:
    a composition for forming a dental prosthesis; and
    a release device comprising:
    (i) a housing for attachment to the dental prosthesis, wherein the housing comprises an attachment chamber operable to receive a dental implant or dental connector, and form a friction fit attachment between the dental implant or dental connector and the prosthesis; and
    (ii) a release member that is movable relative to the housing from a first position to a second position by rotational movement about an axis that is transverse to a longitudinal axis of the attachment chamber of the housing;
    wherein the release device is for arrangement in the prosthesis such that when the release member is in the first position the release device is not operable to impart a separating force to the friction fit attachment between the dental implant or dental connector and the prosthesis, and when the release member is in the second position the release device is operable to abut the dental implant or dental connector so as to impart a separating force to the friction fit attachment between the dental implant or dental connector and the prosthesis; and
    wherein the release member is a captive release member arranged internally within the housing.

15. A kit of parts comprising:
    a release device for a friction fit dental prosthesis for assisting with the release of the dental prosthesis from a dental implant or dental connector, the device comprising:
    (i) a housing for attachment to the dental prosthesis, wherein the housing comprises an attachment chamber operable to receive the dental implant or dental connector, and form a friction fit attachment between the dental implant or dental connector and the prosthesis; and
    (ii) a release member that is movable relative to the housing from a first position to a second position by rotational movement about an axis that is transverse to a longitudinal axis of the attachment chamber of the housing;
    wherein the release device is for arrangement in the prosthesis such that when the release member is in the first position the release device is not operable to impart a separating force to the friction fit attachment between the dental implant or dental connector and the prosthesis, and when the release member is in the second position the release device is operable to abut the dental implant or dental connector such as to impart a separating force to the friction fit attachment between the dental implant or dental connector and the prosthesis; and wherein the release member is a captive release member arranged internally within the housing; and the kit further comprising a mating tool operable to actuate the release member from the first position to the second position.

16. A method of releasing a friction fit attachment between a dental prosthesis and a dental implant or dental connector, the method comprising the steps of:
a. having a dental prosthesis forming a friction fit attachment between a dental implant or dental connector and the dental prosthesis, the dental prosthesis including:
   (i) a release device comprising a housing for attachment to the dental prosthesis, wherein the housing comprises an attachment chamber operable to receive the dental implant or dental connector, and form the friction fit attachment between the dental implant or dental connector and the dental prosthesis; and
   (ii) a release member that is movable relative to the housing from a first position to a second position by rotational movement about an axis that is transverse to a longitudinal axis of the attachment chamber of the housing,
   wherein when the release member is in the first position the release device is not operable to impart a separating force to the friction fit attachment between the dental implant or dental connector and the prosthesis, and when the release member is in the second position the release device is operable to abut the dental implant or dental connector so as to impart a separating force to the friction fit attachment between the dental implant or dental connector and the prosthesis; and
   wherein the release member is a captive release member arranged internally within the housing; and
b. actuating the release member from the first position to the second position such that the prosthesis is released from the dental implant or dental connector.

17. A method of releasing a friction fit attachment as claimed in claim 16 wherein the dental prosthesis is a crown, bridge, or denture.

18. A method for the manufacture of a dental prosthesis comprising one of the steps of:
incorporating a release device into a dental prosthesis during manufacture of said prosthesis, the prosthesis forming a friction fit attachment between a dental implant or dental connector and the prosthesis; and
drilling a hole into the dental prosthesis and bonding the release device within the hole;
wherein the release device comprises:
   (i) a housing for attachment to the dental prosthesis, wherein the housing comprises an attachment chamber operable to receive the dental implant or dental connector, and form the friction fit attachment between the dental implant or dental connector and the dental prosthesis; and
   (ii) a release member that is movable relative to the housing from a first position to a second position by rotational movement about an axis that is transverse to a longitudinal axis of the attachment chamber of the housing,
   wherein when the release member is in the first position the release device is not operable to impart a separating force to the friction fit attachment between the dental implant or dental connector and the dental prosthesis, and when the release member is in the second position the release device is operable to abut the dental implant or dental connector so as to impart a separating force to the friction fit attachment between the dental implant or dental connector and the dental prosthesis; and
   wherein the release member is a captive release member arranged internally within the housing.

19. A method for the manufacture of a dental prosthesis as claimed in claim 18 wherein the dental prosthesis is a crown, bridge, or denture.

20. A method of use of a release device for release of a dental prosthesis from a friction fit attachment with a dental implant or dental connector, the method comprising:
a) applying a dental prosthesis and forming a friction fit attachment between a dental implant or dental connector and the dental prosthesis, the dental prosthesis including:
   (i) a release device comprising a housing for attachment to the dental prosthesis, wherein the housing comprises an attachment chamber operable to receive the dental implant or dental connector, and form the friction fit attachment between the dental implant or dental connector and the dental prosthesis; and
   (ii) a release member that is movable relative to the housing from a first position to a second position by rotational movement about an axis that is transverse to a longitudinal axis of the attachment chamber of the housing,
   wherein when the release member is in the first position the release device is not operable to impart a separating force to the friction fit attachment between the dental implant or dental connector and the dental prosthesis, and when the release member is in the second position the release device is operable to abut the dental implant or dental connector so as to impart a separating force to the friction fit attachment between the dental implant or dental connector and the dental prosthesis; and
   wherein the release member is a captive release member arranged internally within the housing; and
b) operating the release device such that the release member is placed in the second position releasing the dental prosthesis from the dental implant or dental connector.

21. A method of use of a release device as claimed in claim 20 wherein the dental prosthesis is a crown, bridge or denture.

* * * * *